(12) United States Patent
Osuga

(10) Patent No.: US 12,444,545 B2
(45) Date of Patent: *Oct. 14, 2025

(54) ELECTROLYTIC CAPACITOR, NEGATIVE ELECTRODE BODY, AND METHOD FOR MANUFACTURING ELECTROLYTIC CAPACITOR

(71) Applicant: NIPPON CHEMI-CON CORPORATION, Tokyo (JP)

(72) Inventor: Yuki Osuga, Fukushima (JP)

(73) Assignee: NIPPON CHEMI-CON CORPORATION (JP)

( * ) Notice: Subject to any disclaimer, the term of this patent is extended or adjusted under 35 U.S.C. 154(b) by 89 days.

This patent is subject to a terminal disclaimer.

(21) Appl. No.: 18/572,674

(22) PCT Filed: Jun. 21, 2022

(86) PCT No.: PCT/JP2022/024653
§ 371 (c)(1),
(2) Date: Dec. 20, 2023

(87) PCT Pub. No.: WO2022/270492
PCT Pub. Date: Dec. 29, 2022

(65) Prior Publication Data
US 2024/0290549 A1    Aug. 29, 2024

(30) Foreign Application Priority Data

Jun. 22, 2021 (JP) ................................. 2021-103412

(51) Int. Cl.
*H01G 9/042* (2006.01)
*H01G 9/00* (2006.01)
(Continued)

(52) U.S. Cl.
CPC ............ *H01G 9/035* (2013.01); *H01G 9/0029* (2013.01); *H01G 9/0425* (2013.01); *H01G 9/045* (2013.01); *H01G 9/145* (2013.01); *H01G 9/028* (2013.01)

(58) Field of Classification Search
CPC ....... H01G 9/028; H01G 9/035; H01G 9/0029; H01G 9/145; H01G 9/055; H01G 9/042; H01G 9/0425
See application file for complete search history.

(56) References Cited

U.S. PATENT DOCUMENTS 6,304,427 B1    10/2001   Reed et al.
7,916,456 B2    3/2011    Mori et al.
(Continued)

FOREIGN PATENT DOCUMENTS

CN    107403697 A    11/2017
EP    2517220 B1     5/2018
(Continued)

OTHER PUBLICATIONS

International Search Report mailed Sep. 27, 2022 for International Patent Application No. PCT/JP2022/024653.
(Continued)

*Primary Examiner* — David M Sinclair
(74) *Attorney, Agent, or Firm* — Snell & Wilmer LLP

(57) ABSTRACT

The present disclosure provides an electrolytic capacitor in which an increase in the ESR is suppressed even in the high-temperature environment, a cathode body in the electrolytic capacitor, and a manufacturing method of the electrolytic capacitor. The electrolytic capacitor includes an anode foil, a cathode body, and electrolytic solution. The anode foil is formed of valve metal and has dielectric oxide film on a surface of the foil. The cathode body includes cathode foil formed of valve metal and a carbon layer
(Continued)

laminated on the cathode foil. An interfacial resistance between the cathode foil and the carbon layer is 1.1 m$\Omega \cdot$cm$^2$ or less.

20 Claims, 3 Drawing Sheets

(51) Int. Cl.
*H01G 9/035* (2006.01)
*H01G 9/045* (2006.01)
*H01G 9/145* (2006.01)
*H01G 9/028* (2006.01)

(56) References Cited

U.S. PATENT DOCUMENTS

| | | | |
|---|---|---|---|
| 2018/0047511 | A1 | 2/2018 | Tsuda |
| 2021/0193395 | A1* | 6/2021 | Koseki .................. H01G 9/042 |
| 2024/0290550 | A1* | 8/2024 | Koseki ................. H01G 9/0425 |

FOREIGN PATENT DOCUMENTS

| | | |
|---|---|---|
| JP | 2005109272 A | 4/2005 |
| JP | 2006190878 A | 7/2006 |
| JP | 2008-027998 A | 2/2008 |
| WO | 2006073014 A1 | 7/2006 |
| WO | 2016174806 A1 | 11/2016 |
| WO | 2020059609 A1 | 3/2020 |

OTHER PUBLICATIONS

The extended European Search Report dated Jan. 7, 2025 for corresponding European Application No. 22828409.7; 10 pages.
Japanese Notice of Reasons for Refusal dated Jul. 8, 2025 for corresponding Japanese Application No. 2021-103412; 6 pages.

* cited by examiner

ELECTROLYTIC CAPACITOR, NEGATIVE ELECTRODE BODY, AND METHOD FOR MANUFACTURING ELECTROLYTIC CAPACITOR

FIELD OF INVENTION

The present disclosure relates to an electrolytic capacitor, a cathode body included in the electrolytic capacitor, and a production method of the electrolytic capacitor.

BACKGROUND

The electrolytic capacitor is formed by anode foil in which dielectric oxide film is formed on valve metal such as tantalum or aluminum, and cathode foil formed of foil made of the same or different metal facing each other. Electrolytic solution intervenes between the anode foil and the cathode foil. The electrolytic solution intervenes between the anode foil and the cathode foil and closely contacts with an uneven surface of the anode foil, and acts as a true cathode.

In recent years, electrolytic capacitors in which a solid electrolyte is intervened between the anode foil and the cathode foil instead of electrolytic solution is widely used. The electrolytic capacitors with solid electrolytes are compact, large capacity, low equivalent series resistance, and are essential for downsizing and high functionality of electronic devices. Manganese dioxide and 7,7,8,8-tetracyanoquinodimethane (TCNQ) complex are known as solid electrolytes. In addition, conductive polymers derived from monomers with n-conjugated double bonds are rapidly becoming popular as solid electrolytes. For example, conductive polymers may be poly(3,4-ethylenedioxythiophene) (PEDOT). Conductive polymers express high conductivity when using polyanions such as organic sulfonic acid and the like as a dopant and express excellent adhesion to dielectric oxide film in chemical oxidative polymerization or electrolytic oxidative polymerization.

However, the electrolytic capacitors with solid electrolytes are less effective in repairing defect in the dielectric oxide film than the liquid-type electrolytic capacitors with electrolytic solution. So-called hybrid-type electrolytic capacitors in which a solid electrolyte is intervened between the anode foil and the cathode foil and a capacitor element is impregnated with electrolytic solution is getting attention.

Here, to reduce an ESR which is also called Equivalent Series Resistance, an electrolytic capacitor in which metal carbide with low electrical resistivity such as TiC, Wc, and ZrC, is formed on a surface of the cathode foil is suggested (for example, refer Patent Document 1). According to this suggestion, the ESR of the electrolytic capacitor can be reduced because the adhesion between the metal carbide and the conductive polymer is excellent.

However, there is a problem that the oxide film gradually grows on the surface of the metal carbide. Therefore, an electrolytic capacitor in which carbon is formed on the surface of the cathode foil using dry plating such as ion plating is suggested (for example, refer Patent Document 2). Note that the objective of this solid electrolytic capacitor is to asymptote the capacity at the cathode side and make the capacity of the electrolytic capacitor to be only the anode capacity by preventing the oxide film from being formed on the cathode foil.

PRIOR ART DOCUMENT

Patent Document

Patent Document 1: JP2005-109272A
Patent Document 2: JP2006-190878A

SUMMARY OF INVENTION

Problems to be Solved by Invention

Even in the electrolytic capacitor with a cathode body in which a carbon layer is formed on the surface of the cathode foil, it is observed that the ESR largely increases when said electrolytic capacitor is exposed under a high-temperature environment of 120° C. or more. The following phenomena are considered as the reason why the ESR under increase the high-temperature environment of 120° C. or more.

That is, the electrolytic capacitor may include moisture. For example, an aqueous solvent may be used as the solvent of the electrolytic solution or a mixture of water and an organic solvent may be used as the solvent of the electrolytic solution. Furthermore, when the solvent of the electrolytic solution is alcohol and carboxylic acid or ion-dissociative salt of carboxylic acid is included as the solute, moisture is produced due to esterification.

When the moisture contacts with the cathode foil, the oxide film is formed on the cathode foil by the hydration between the cathode foil and the moisture, and this oxide film grows. When the oxide film that is the insulative component is formed and grows on the cathode foil, the ESR of the electrolytic capacitor increases. Even when the carbon layer is formed on the surface of the cathode foil, the oxide film is formed when the electrolytic capacitor is exposed under the high-temperature environment and the moisture enters between the cathode foil and the carbon layer and contacts with the cathode foil.

The present disclosure has been proposed to address the above problems, and an objective of the present disclosure is to provide an electrolytic capacitor in which an increase in the ESR is suppressed even in the high-temperature environment, a cathode body with the electrolytic capacitor, and a manufacturing method of the electrode body.

Means to Solve the Problem

The inventors have researched and found the following knowledge. That is, when the carbon layer is laminated on the cathode foil and the interfacial resistance between the cathode foil and the carbon layer is more than 1.1 m$\Omega \cdot cm^2$, the ESR of the electrolytic capacitor largely increases when the electrolytic capacitor is exposed under the high-temperature environment of 120° C. or more In contrast, when the carbon layer is laminated on the cathode foil and the interfacial resistance between the cathode foil and the carbon layer is 1.1 m$\Omega \cdot cm^2$ or less, the ESR of the electrolytic capacitor does not increase even when the electrolytic capacitor is exposed under a high-temperature environment of 120° C. or more.

Based on this knowledge, to address the above-described problem, an electrolytic capacitor of the present disclosure is an electrolytic capacitor including:
anode foil, a cathode body, and electrolytic solution,
in which the anode foil is formed of valve metal and has dielectric oxide film formed on a surface thereof, the cathode body includes cathode foil formed of valve metal and a carbon layer laminated on the cathode foil, and an interfacial resistance between the cathode foil and the carbon layer is 1.1 mΩ·cm$^2$ or less.

The electrolytic solution may include water.

The electrolytic solution may include alcohol as a solvent and carboxylic acid, carboxylic acid salt, or both as a solute.

The cathode foil may have an enlarged surface layer on a surface thereof and have the carbon layer on the enlarged surface layer. When the enlarged surface layer is formed in addition to the carbon layer, the cathode foil and the carbon layer adhere to each other due to the anchor effect produced by carbon material entering recesses in the enlarged surface layer, so that the interfacial resistance between the cathode foil and the carbon layer can be reduced easier.

The carbon layer may be pressure-welded to the cathode foil. When the carbon layer is formed and is pressure-welded on the cathode foil, the interfacial resistance between the cathode foil and the carbon layer can be reduced easier. Note that it is preferable to perform both the pressure-welding of the carbon layer to the cathode foil and the formation of the enlarged surface layer to the cathode foil. When the carbon layer is pressure-welded to the cathode foil on which the enlarged surface layer is formed, the carbon material of the carbon layer is pressed into pores of the enlarged surface layer and the carbon layer deforms along an uneven surface of the enlarged surface layer, so that the adhesion and fixity of the carbon layer and the cathode foil is further improved. Therefore, the interfacial resistance between the cathode foil and the carbon layer can be reduced easier.

The electrolytic capacitor may further include a solid electrolyte layer formed on the surface of the anode foil and the surface of the cathode body.

Furthermore, to address the above-described problem, a cathode body of the electrolytic capacitor is also one aspect of the present disclosure, and the cathode body includes cathode foil and a carbon layer formed on the cathode foil, and an interfacial resistance between the cathode foil and the carbon layer is 1.1 mΩ·cm$^2$ or less.

Furthermore, to address the above-described problem, a manufacturing method of the electrolytic capacitor is one aspect of the present disclosure, and the manufacturing method electrolytic capacitor including the anode foil, the cathode body, and the electrolytic solution includes: a cathode body production process of forming a carbon layer on cathode foil formed of valve metal and pressure-welding the carbon layer to the cathode foil by pressing until an interfacial resistance therebetween becomes 1.1 mΩ·cm$^2$ or less to produce a cathode body, and a capacitor element production process of arranging the anode foil which dielectric oxide film is formed on a surface and the cathode body produced in the cathode body production process to face each other to produce a capacitor element, and an impregnation process of impregnating the capacitor with element the electrolytic solution.

Effect of Invention

According to the present disclosure, an increase in the ESR due to moisture can be suppressed even when the electrolytic capacitor is exposed under the high-temperature environment.

EMBODIMENTS

Figure 1:
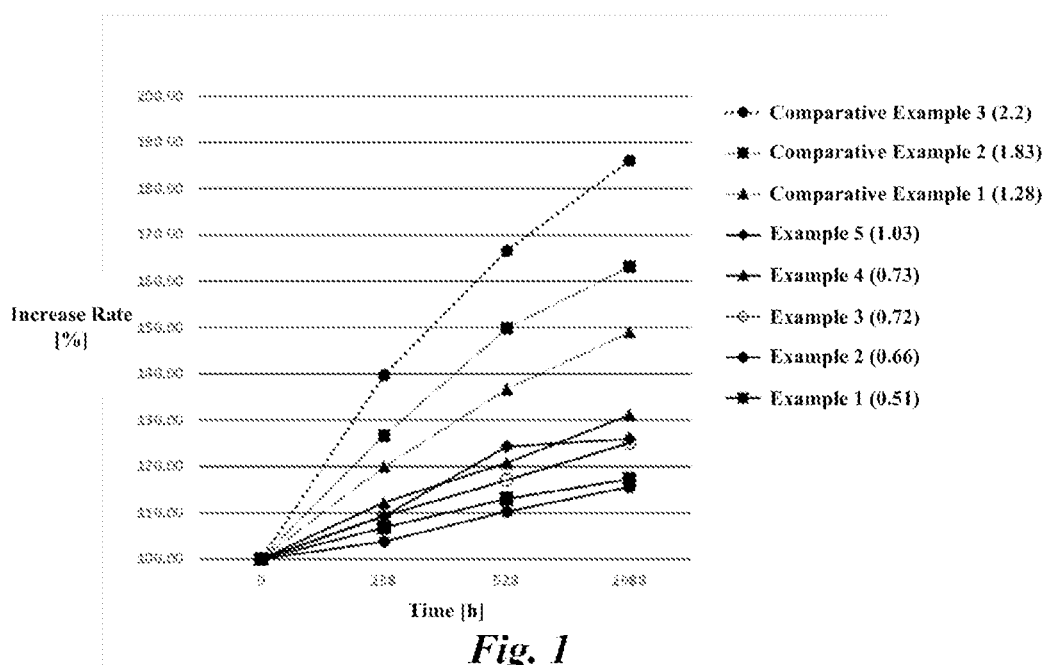
FIG. 1 is a graph indicating changes over time of an increase rate of the ESR in each example and each comparative example under the temperature environment of 125° C.

Hereinafter, an electrolytic capacitor and the manufacturing method thereof according to the embodiment of the present disclosure will be described. Note that the present disclosure is not limited to the following embodiments.

(Overall Configuration)

An electrolytic capacitor is a passive element that gains the capacitance and stores and discharges electric charge by the dielectric polarization of dielectric oxide film. The electrolytic capacitor includes anode foil in which dielectric oxide film is formed on a surface, a cathode body via, an electrolyte, and a separator. The anode foil and the cathode body are arranged to face each other, and the electrolyte and the separator are intervened between the anode foil and the cathode body. The anode foil and the cathode body are arranged in a laminated-type in which they are laminated alternately via the separator, or arranged in a wound-type in which they are wound via the separator.

The electrolyte is arranged between the anode foil and the cathode body in a state of electrolytic solution or electrolytic solution and a solid electrolyte layer. The electrolyte adheres to the dielectric oxide film on the anode foil and becomes a true cathode which transfers the electric field of the foil. The separator prevents short-circuit between the anode foil and the cathode body or holds the electrolyte.

(Electrode Foil)

The cathode body includes cathode foil. The anode foil and the cathode foil of the cathode body are foil bodies formed of valve metal. The valve metal is aluminum, tantalum, niobium, niobium oxide, titanium, hafnium, zirconium, zinc, tungsten, bismuth, and antimony, etc. The purity of the anode foil is desirably 99.9% or more, and the purity of the cathode foil is desirably about 99% or more, however, impurities such as silicon, iron, copper, magnesium, and zinc may be included.

An enlarged surface layer with an enlarged surface structure is formed on one surface or both surface of the anode foil and the cathode foil. The enlarged surface layer is formed by electrolytic etching, chemical etching, or sandblasting, and the like, or formed by vapor-depositing or sintering metal particles and the like, on a foil body. That is, the enlarged surface layer is formed by tunnel-shaped etching pits, spongy pits, or air gaps between dense powder. The electrolytic etching may be DC etching or AC etching in which direct current or alternating current is applied in acidic aqueous solution with halogen ions, such as hydrochloric acid. Furthermore, in the chemical etching, the anode foil and the cathode foil are immersed in acidic solution or alkaline solution. Note that the tunnel-shaped etching pits may be formed in a length that penetrates through the foil or a length that does not reach the center of the foil.

Typically, the dielectric oxide film of the anode foil is oxide film formed on a surface layer of the anode foil. For example, when the anode foil is aluminum foil, the dielectric oxide film is aluminum oxide obtained by oxidizing the surface layer of the enlarged surface layer. The dielectric oxide film is intentionally formed by chemical conversion treatment in which voltage is applied in solution without halogen ions such as aqueous solution of adipic acid, boric acid or phosphoric acid, etc. Also, the oxide film may be naturally or intentionally formed on the surface layer of the cathode foil by this chemical conversion treatment. The natural oxide film that was naturally formed on the surface layer of the cathode foil is formed when oxygen in the air reacts with the cathode foil.

(Cathode Body)

The cathode body includes a carbon layer in addition to the cathode foil. The carbon layer is laminated on the the cathode foil. The carbon layer is a layer including carbon material. The carbon material is fibrous carbon, carbon powder, or a mixture thereof. It is preferable that the fibrous carbon or the carbon powder is subjected to porous treatment such as activation treatment or opening treatment to form pores.

For example, the carbon powder is natural plant tissue such as coconut shell, synthetic resin such as phenol, activated carbon made from fossil fuel such as coal, coke, pitch, and the like, carbon black such as Ketjen black, acetylene black, channel black, or thermal black, carbon nanohorn, amorphous carbon, natural graphite, artificial graphite, graphitized Ketjen black, and mesoporous carbon, etc. For example, the fibrous carbon is carbon nanotube, or carbon nanofiber, etc. The carbon nanotube may be single-walled carbon nanotube with a single layer of a graphene sheet, or multi-walled carbon nanotube (MWCNT) in which two or more layers of graphene sheets are curled up on a same axis and a tube wall forms multiple layers.

Here, a interfacial resistance between the carbon layer and the cathode foil is adjusted to be smaller. A value of the interfacial resistance and the adhesion degree of the carbon layer and the cathode foil are correlated. Therefore, when the interfacial resistance is small, a gap between the carbon layer and the cathode foil becomes smaller. When the gap between the carbon layer and the cathode foil becomes smaller, it becomes difficult for moisture in the electrolytic solution to contact with the surface of the cathode foil. If the chance for the cathode foil and moisture to contact with each other is reduced, the hydration reaction of the cathode foil and moisture can be suppressed, making it difficult for the oxide film to be formed on the surface of the cathode foil, and even when the oxide film is formed, the oxide film hardly grows. Then, the harder the oxide film that is the insulator is formed on the cathode foil, the more the increase in the ESR of the electrolytic capacitor can be suppressed.

However, the effect of suppressing the increase in the ESR by this mechanism is considered to be inversely proportional to the low interfacial resistance when thinking about the correlation relationship between the interfacial resistance and the adhesion degree. However, the change in the ESR of the electrolytic capacitor under a high-temperature environment significantly differ beyond the range explainable by this mechanism at the interfacial resistance between the cathode foil and the carbon layer of 1.1 m$\Omega \cdot$cm$^2$. When the interfacial resistance between the carbon layer and the cathode foil is 1.1 m$\Omega \cdot$cm$^2$ or less, the increase in the ESR of the electrolytic capacitor can be suppressed even when the electrolytic capacitor is exposed under the high-temperature environment of 120° C. In contrast, when the interfacial resistance between the cathode foil and the carbon layer is more than 1.1 m$\Omega \cdot$cm$^2$, the ESR of the electrolytic capacitor largely increases when the electrolytic capacitor is exposed under the high-temperature environment of 120° C. or more.

Here, the interfacial resistance between the carbon layer and the cathode foil is adjusted to be 1.1 m$\Omega \cdot$cm$^2$ or less. By this, the increase in the ESR of the electrolytic capacitor can be greatly suppressed even when the electrolytic capacitor is exposed under a high-temperature environment of 120° C. Press processing to pressure-weld the carbon layer and the cathode foil can be employed and is preferable for the adjustment method of the interfacial resistance between the carbon layer and the cathode foil. In the press processing, a laminate body of the carbon layer and the cathode foil is sandwiched by a press roller, and press linear pressure is applied. The press linear pressure is desirably about 0.01 to 100 t/cm. In addition, press temperature that is temperature of the press roller at the time of the pressing is desirably 0 to 200° C.

Note that the carbon layer is formed on cathode foil by vacuum vapor-deposition, sputtering, ion plating, CVD, application, electrolytic plating, or electroless plating, and the like before the press processing. In a case of the application, carbon material is dispersed in a dispersion solvent to form a slurry, and the slurry is applied and dried on the cathode foil by slurry casting, doctor blading, or spray spraying, etc. In a case of the vacuum vapor-deposition, carbon material is evaporated by electrical heating in vacuum or is evaporated by electron beam irradiation in vacuum, and film of the carbon material is formed on the cathode foil. Furthermore, in the case of the sputtering, the cathode foil and a target formed of carbon material are placed in a vacuum container, inert gas is introduced into the vacuum container, and voltage is applied to bombard the target with the plasma inert gas, so that particles of carbon material beaten out from the target is deposited on the cathode foil.

Furthermore, to reduce the interfacial resistance of the carbon layer and the cathode foil, it is preferable to intentionally form the oxide film of about 0.5 V to 3 V on the cathode foil by chemical conversion treatment. The oxide film formed on the cathode foil may increase the interfacial resistance of the electrolytic capacitor and may improve the adhesion of the carbon layer and the cathode foil. When the carbon layer is formed on the cathode foil with the oxide film of 0.5 V to 3 V, the adhesion is improved strongly than the oxide film beyond this range, and the interfacial resistance between the carbon layer and the cathode foil easily decreases to 1.1 m$\Omega \cdot$cm$^2$ or less.

Furthermore, the enlarged surface layer may be formed on the surface of the cathode foil to adjust the interfacial resistance between the carbon layer and the cathode foil. By forming the enlarged surface layer on the surface of the cathode foil, carbon material of the carbon layer enters the unevenness of the enlarged surface layer, and the interfacial resistance between the carbon layer and the cathode foil can be reduced. By press processing the carbon layer and the cathode foil after forming the enlarged surface layer on the cathode foil, the interfacial resistance can be more easily reduced.

Furthermore, carbon material included in the carbon layer may be selected to adjust the interfacial resistance between the carbon layer and the cathode foil. The carbon material is preferably carbon black that is spherical carbon. By using spherical carbon black with primary particle diameter of 100 nm or less, the carbon layer becomes dense and can easily adhere to the enlarged surface layer, reducing the interfacial resistance.

Furthermore, the carbon material included in the carbon layer may be flake or vein graphite and carbon black that is spherical carbon. It is preferable that the flake or vein graphite has an aspect ratio between short and long diameters of 1:5 to 1:100. When the carbon layer including this combination of the carbon material is laminated on the cathode foil, is compressed, and is pressure-welded to the enlarged surface layer, carbon black becomes easier to be rubbed into the enlarged surface layer by graphite. Graphite easily deforms along an uneven surface of the enlarged surface layer and can be easily laminated on the uneven surface. Accordingly, graphite acts as a pressing lid that presses and holds the spherical carbon inside the enlarged surface layer. Therefore, the interfacial resistance between the carbon layer and cathode foil can be reduced easier.

Note that the interfacial resistance can be measured as described below. That is, potential of the surface of the carbon layer of the cathode body on which the carbon layer is formed is measured at a plurality of points. The surface of the carbon layer where the potential is measured is a surface opposite the surface adhering with the cathode foil or an exposed surface of the cathode body. To measure the potential, a test needle for application and a test needle for measurement are contacted with the surface of the carbon layer, and resistance calculated when applying predetermined DC current between the test needles is the "interfacial resistance in the cathode". For example, a suitable apparatus to measure the interfacial resistance in the cathode may be the electrode resistance measurement system RM2610 from HIOKI E.E. CORPORATION.

(Electrolytic Solution)

The solvent of the electrolytic solution is water, a protic organic polar solvent, or an aprotic organic polar solvent, and may be used in single or in combination of two or more. The solute includes anion components or cation components. Typically, the solute is organic acid salt, inorganic acid salt, or salt of composite compound of organic acid and inorganic acid, and may be used in single or in combination of two or more. Acid that is the anion and base that is the cation may be separately added to the electrolytic solution as solute components.

The protic organic polar solvent may be monohydric alcohol, polyhydric alcohol, and oxyalcohol compound, etc. The monohydric alcohol may be ethanol, propanol, butanol, pentanol, hexanol, cyclobutanol, cyclopentanol, cyclohexanol, benzyl alcohol, etc. Polyhydric alcohol and oxyalcohol compounds may be ethylene glycol, propylene glycol, glycerin, methyl cellosolve, ethyl cellosolve, methoxypropylene glycol, dimethoxypropanol, etc.

The aprotic organic polar solvent may be sulfones, amides, lactones, cyclic amides, nitriles, and sulfoxides, etc. The sulfone may be dimethyl sulfone, ethylmethyl sulfone, diethyl sulfone, sulfolane, 3-methyl sulfolane, 2,4-dimethyl sulfolane, etc. The amide may be N-methylformamide, N, N-dimethylformamide, N-ethylformamide, N, N-diethylformamide, N-methylacetamide, N, N-dimethylacetamide, N-ethylacetamide, N, N-diethylacetamide and hexamethylphosphoricamide, etc. The lactone and the cyclic amide may be γ-butyrolactone, γ-valerolactone, δ-valerolactone, N-methyl-2-pyrrolidone, ethylene carbonate, propylene carbonate, butylene carbonate, and isobutylene carbonate, etc. The nitrile may be acetonitrile, 3-methoxypropionitrile, and glutaronitrile, etc. The sulfoxide may be dimethyl sulfoxide, etc.

Organic acid may be oxalic acid, succinic acid, glutaric acid, pimelic acid, suberic acid, sebacic acid, phthalic acid, isophthalic acid, terephthalic acid, maleic acid, adipic acid, benzoic acid, and toluyl acid, enanthic acids, malonic acids, carboxylic acids such as 1,6-decandicarboxylic acid, 1,7-octanedicarboxylic acid, azelaic acid, undecanedioic acid, dodecanedioic acid, tridecanedioic acid, phenols and sulfonic acids, etc. The inorganic acid may be boric acid, phosphoric acid, phosphorus acid, hypophosphorous acid, carbonic acid, and silicic acid, etc. The composite compound of organic acid and inorganic acid may be borodisalicylic acid, borodioxalic acid, and borodiglycolic acid.

At least one salt of the organic acid, the inorganic acid, and the composite compound of organic acid and inorganic acid may be ammonium salt, quaternary ammonium salt, quaternary amidinium salt, amine salt, sodium salt, and potassium salt, etc. Quaternary ammonium ion of the ammonium quaternary salt may be tetramethylammonium, triethylmethylammonium, and tetraethylammonium, etc. The quaternary amidiniums may be ethyldimethylimidazolinium and tetramethylimidazolinium, etc. Amines in the amine salt may be primary amines, secondary amines, and tertiary amines. The primary amine may be methylamine, ethylamine, propylamine, and the like, the secondary amines may be dimethylamine, diethylamine, ethylmethylamine and dibutylamine, and the like, and the tertiary amines may be trimethylamine, triethylamine, tributylamine, ethyldimethylamine, and ethyldiisopropylamine, and the like. Ion dissociation salt having the anion component that is the organic salt, the inorganic salt, and the composite compound of organic salt and inorganic salt, and the cation component that is the base may be added to the electrolytic solution.

A combination including reaction source of esterification is used as the solvent and solute of the electrolytic solution. That is, in the first pattern of the electrolytic solution, the solvent includes water, and other material is not particularly limited. Furthermore, in the second pattern of the electrolytic solution, monohydric alcohol, polyhydric alcohol, oxyalcohol compound, or combination thereof is used as the solvent, carboxylic acid or carboxylic acid salt is included as the solute, and other material is not particularly limited. The esterification of the alcohol and carboxylic acid produces water that hydrates with the cathode foil. In the third pattern of the electrolytic solution, the electrolytic solution is a mixture of the first pattern and the second pattern.

Furthermore, other additives may be added to the electrolytic solution. The additive may be polyethylene glycol, complex compounds of boric acid and polysaccharides (mannit, sorbit, etc.), complex compounds of boric acid and polyhydric alcohol, borate esters, nitro compounds, phosphate esters, and colloidal silica, etc. These may be used in single or in combination of two or more. The nitro compound suppresses an amount of hydrogen gas produced in the electrolytic capacitor. The nitro compound may be o-nitrobenzoic acid, m-nitrobenzoic acid, p-nitrobenzoic acid, o-nitrophenol, m-nitrophenol, and p-nitrophenol, etc.

After the preparation, the electrolytic solution is impregnated in the capacitor element. The capacitor element is formed by facing the anode foil on which the dielectric oxide film formed and a cathode body in which the carbon layer is laminated on the cathode foil via the separator. At the time of the impregnation, depressurization process or pressurization process may be performed to facilitate the impregnation of the electrolytic solution to the capacitor element. The impregnation process may be repeated for multiple times. Note that, when using the solid electrolyte layer together, the electrolytic solution is impregnated in the capacitor element on which the solid electrolyte layer is formed.

(Solid Electrolyte)

The solid electrolyte includes conductive polymers. The conductive polymer is a conjugated polymer or a doped conjugated polymer. The conjugated polymer is obtained by chemical oxidative polymerization or electrolytic oxidative polymerization of monomers with a π-conjugated double bond or a derivative thereof. The conductive polymer is expresses high conductivity by the doping ti the conjugated polymer.

As the conjugated polymer, known polymers may be used without limitation. For example, the conjugated polymer may be polypyrrole, polythiophene, polyfuran, polyaniline, polyacetylene, polyphenylene, polyphenylenevinylene, polyacene, and polythiophenevinylene, etc. Representatively, the conductive polymer may be poly(3,4-ethylenedioxythiophene, which is called PEDOT, doped with polystyrene sulfonic acid (PSS). These conjugated polymers may be used in single or in combination of two or more, and may further be a copolymer of two or more kinds of monomers.

As dopants, known dopants may be used without limitation. For example, the dopant may be inorganic acid such as boric acid, nitric acid, and phosphoric acid, and organic acid such as acetic acid, oxalic acid, citric acid, ascot acid, tartaric acid, squaric acid, logisonic acid, croconic acid, salicylic acid, p-toluenesulfonic acid, 1,2-dihydroxy-3,5-benzenedisulfonic acid, methanesulfonic acid, trifluoromethanesulfonic acid, borodisalicylic acid, sulfonylimide acid, bisoxalate borate acid, dodecylbenzenesulfonic acid, propylnaphthalenesulfonic acid, and butylnaphthalenesulfonic acid. Polyanions may be used as the dopant, and the polyanion may be polyvinyl sulfonic acid, polystyrene sulfonic acid, polyallyl sulfonic acid, polyacrylic sulfonic acid, polymethacrylic sulfonic acid, poly(2-acrylamide-2-methylpropanesulfonic acid), polyisoprene sulfonic acid, and polyacrylic acid, polymethacrylic acid, and polymaleic acid, etc. The dopant may be used in single or in combination of two or more. Furthermore, the dopant may also be polymers or monomers.

The solid electrolyte layer is formed by impregnating the capacitor element with dispersion in which the conductive polymer is dispersed. The solvent of the dispersion may be any solvent if particles or powder of the conductive polymer are dispersed, and water is mainly used. Ethylene glycol may be used as the solvent of the dispersion, if necessary. It was found that when ethylene glycol is used as the solvent of the dispersion, especially the ESR characteristic among the electrical characteristic of the product can be reduced. Note that to improve the impregnation performance and electrical conductivity of the dispersion, various additives may be used for the dispersion, and the dispersion may be neutralized by adding cations.

For the impregnation method of the dispersion of the conductive polymer, the capacitor element may be immersed in the dispersion, or dropwise application or spray application and the like may be employed. Furthermore, the impregnation is not limited to the entire capacitor element, and the capacitor element may be assembled after the anode foil and the cathode body is impregnated with the dispersion. Depressurization process or pressurization process may be performed to facilitate the impregnation of the dispersion to a pair of the electrodes, if necessary. This adhesion process may be repeated for multiple times.

Furthermore, the solid electrolyte layer may be formed by known electrolytic polymerization or chemical polymerization. In the chemical polymerization, the solid electrolyte layer is formed by impregnating the capacitor element with solution in which monomers and oxidizing agents are dissolved in the solvent and drying the capacitor element, or by impregnating the capacitor element with solution in which oxidizing agents are dissolved in the solvent and drying the capacitor element. For example, the solid electrolyte is formed by immersing the capacitor element in the mixture solution of the polymerizable monomer and the oxidizing agent and heating the capacitor element to cause the polymerization reaction of the conductive polymer, wherein 3,4-ethylenedioxythiophene is used as the polymerizable monomer and alcohol solution (for example, ethanol) of ferric p-toluenesulfonate is used as the oxidizing agent. Furthermore, a rinsing process to remove unreacted monomers and excessive monomers by rinsing may be performed before and after the heating process.

In the electrolytic polymerization, the solid electrolyte layer is formed introducing the capacitor element into the electrolytic polymerization solution at least including monomers, supporting electrolytes, and solvents and applying voltage between the anode and the cathode. Monomer that gains conductivity by the electrolytic polymerization may be used for the electrolytic polymerization solution. Thiophene monomers and pyrrole monomers are suitable for the monomers. When using these monomers, the capacitor element is immersed in the electrolytic polymerization solution containing the monomers and sodium 1-naphthalenesufonate that is the supporting electrolyte in the stainless container, and the predetermined voltage is applied. By this, the solid electrolyte layer by the water-soluble monomers (for example, thiophene and pyrrole) by the electrolytic polymerization can be uniformly formed.

(Separator)

The separator includes cellulose such as kraft, Manila hemp, esparto, hemp, and rayon, and mixed papers thereof, polyester resin such as polyethylene terephthalate, polybutylene terephthalate, polyethylene naphthalate, and derivatives thereof, polytetrafluoroethylene resin, polyvinylidene fluoride resin, vinylon resin, aliphatic polyamide, semi-aromatic polyamide, polyamide resin such as total aromatic polyamide, polyimide resin, polyethylene resin, polypropylene resin, trimethylpentene resin, polyphenylene sulfide resin, acrylic resin, polyvinyl alcohol resin and the like, and these resin may be used in single or in combination.

Note that the separator holds the solid electrolyte layer and the electrolytic solution and prevents short-circuit of the anode foil and the cathode body. The separator may not be provided if the solid electrolyte layer can keep its shape, each portion of the capacitor element including the solid electrolyte layer can hold the electrolytic solution, and the solid electrolyte layer has thickness enough to prevent short-circuit of the anode foil and the cathode foil without the separator.

(Manufacturing Method)

Such an electrolytic capacitor is manufactured via an anode foil production process of producing the anode foil, a cathode body production process of producing the cathode body, a capacitor element production process of producing the capacitor element in which the anode foil and the cathode body face each other, a solid electrolyte layer formation process of forming the solid electrolyte layer on the capacitor element, and an electrolytic of impregnating the solution impregnation process capacitor element on which the solid electrolyte layer is formed with the electrolytic solution.

In the anode foil production process, valve metal is elongated to form the anode foil, and after forming the enlarged surface layer on the anode foil, the dielectric oxide film is formed on the surface of the enlarged surface layer. In the cathode body production process, valve metal is elongated to form the cathode foil, and the enlarged surface layer on the cathode foil. Furthermore, in the cathode body production process, the carbon layer is formed on the cathode foil, the carbon layer is pressure-welded to the cathode foil by press processing to make the interfacial resistance between the carbon layer and the cathode foil to be 1.1 mΩ·cm² or less.

In the capacitor element production process, the anode foil on which the dielectric oxide film is formed, and a cathode body are laminated via the separator. For the laminated-type capacitor element, the anode foil and the cathode bodies are alternately laminated via the separator for multiple layers. For the wound-type capacitor element, the anode foil and cathode body laminated via the separator is wound. In the solid electrolyte layer is formed by impregnating the capacitor element with dispersion in which the conductive polymer is dispersed. In the electrolytic solution impregnation process, the capacitor element on which the solid electrolyte layer is formed by the solid electrolyte layer formation process is impregnated with the electrolytic solution.

By this the electrolytic capacitor with the interfacial resistance between the cathode foil and the carbon layer of 1.1 mΩ·cm² or less can be produced. The increase in the ESR of the electrolytic capacitor can be suppressed even when the electrolytic capacitor is exposed under the high-temperature environment of 120° C. In particular, the electrolytic capacitor acts more effectively if all or a part of the solvent of the electrolytic solution is water-based solvents and if alcohol is included as the solvent and carboxylic acid, carboxylic acid salt, or both is used as the solute.

Hereinafter, the electrolytic capacitor of the present disclosure will be described in more detail based on the examples. Note that the present disclosure is not limited to the following examples.

Examples 1 to 5

Solid electrolytic capacitors of examples 1 to 5 and comparative examples 1 to 3 were manufactured as follows. Aluminum foil was employed as an anode foil and a cathode foil in the solid electrolytic capacitor. AC etching was performed on the anode foil and the cathode foil to form enlarged surface layers formed by spongy etching pits on both surface of the foil. In the AC etching process, the cathode foil was immersed in acidic aqueous solution with hydrochloric acid having liquid temperature of 25° C. and percent by weight of 8 wt % as a main electrolyte, and current with alternating current of 10 Hz and current density of 0.14 A/cm² was applied to the substrate for about 5 minutes. Furthermore, chemical conversion treatment was performed on the anode foil to form dielectric oxide film on the surface of the of the enlarged surface layer of the anode foil. In the chemical conversion treatment, after chlorine attached in the AC etching process was removed using phosphoric acid aqueous solution, voltage was applied in aqueous solution of ammonium dihydrogenphosphate.

A carbon layer was laminated on the enlarged surface layer of the cathode foil to complete a cathode body including the cathode foil and the carbon layer. Carbon black was selected for carbon material of the carbon layer. Powder of the carbon black, styrene butadiene rubber (SBR) as a binder, and sodium carboxymethyl cellulose (CMC-Na) aqueous solution as aqueous solution containing dispersing agent were mixed and kneaded to produce a slurry, and the slurry was uniformly applied on the cathode foil. Then, the slurry was heated and dried to volatilize the solvent.

After the carbon layer had been formed on the enlarged surface layer of the cathode foil, a pressing process to press the carbon layer to the enlarged surface was performed. In the pressing process, the cathode body was sandwiched by a press roller, and press linear pressure was applied.

Here, the interfacial resistance between the cathode foil and the carbon layer was varied for each example and comparative example by performing the press processing under different pressing condition for each example and comparative example. The press linear pressure, the press temperature, and the interfacial resistance for each example and comparative example are shown in the below table 1. Note that the change in the interfacial resistance relative to the press linear pressure and the press temperature were different depending on the thickness fo the cathode foil and the thickness of the carbon layer, for example.

TABLE 1

|  | Press Linear Pressure (kN/cm) | Press Temperature (° C.) | Interfacial Resistance (mΩ · cm²) |
| --- | --- | --- | --- |
| Example 1 | 7 | 150 | 0.51 |
| Example 2 | 7 | 70 | 0.66 |
| Example 3 | 4 | 70 | 0.72 |
| Example 4 | 2 | 150 | 0.73 |
| Example 5 | 3 | 70 | 1.03 |
| Comparative Example 1 | 3.5 | 70 | 1.28 |
| Comparative Example 2 | 1 | 150 | 1.83 |
| Comparative Example 3 | 2 | 70 | 2.2 |

The anode foil and the cathode body were each connected by stitch to a tab-shaped lead terminal made of aluminum. This anode foil and the cathode body were wound via a separator therebetween to produce a capacitor element including the anode foil, the cathode body, and the separator. A manila-type separator was used as the separator. After the winding, defects the capacitor elements produced by the winding were chemically repaired.

Next, dispersion of conductive polymer was prepared. The dispersion was formed by dispersing powder of polyethylene dioxythiophene (PEDOT) doped with polystyrene sulfonic acid (PSS) in water. The capacitor element was immersed in the dispersion. During the immersion, pressure of 30 kPA was applied for 120 seconds. Then, the capacitor element was pulled out and dried at 150° C. for 30 minutes. The immersion and the drying were repeated twice. By this, the solid electrolyte layer including polyethylene dioxythiophene (PEDOT) doped with polystyrene sulfonic acid (PSS) as the conductive polymers polymer was adhered to the dielectric oxide film of the anode foil and was laminated on the carbon layer of the cathode body.

Next, the electrolytic solution was prepared, and the capacitor element on which the solid electrolyte layer had been formed was impregnated with the electrolytic solution. Ethylene glycol as a solvent and ammonium azelaic acid as a solute were added to prepare the electrolytic solution. Ethylene glycol was dihydric alcohol, azelaic acid was saturated dicarboxylic acid, and water was produced over time by the esterification of ethylene glycol and azelaic acid. Furthermore, the esterification was facilitated under the high-temperature environment.

The capacitor element was inserted into a bottomed cylindrical outer casing, a sealing rubber was attached to an end of an opening, and the casing was sealed by a crimping process. Then, the solid electrolytic capacitor was aged under the high-temperature environment of 115° C. for 45 minutes. The solid electrolytic capacitors of the example and the comparative example produced as above had the constant resistance voltage of 25 WV, the constant capacity of 270 μF, and the size of 10 mm in diameter and 8 mm in height.

(ESR Evaluation)

Figure 2:
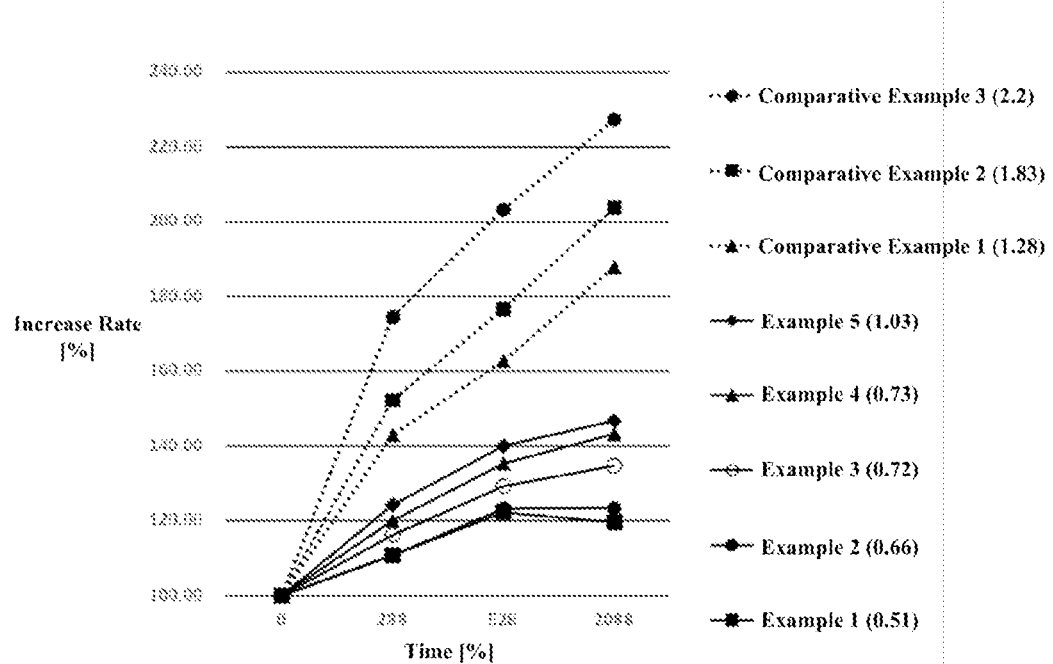
FIG. 2 is a graph indicating changes over time of an increase rate of the ESR in each example and each comparative example under the temperature environment of 135° C.
Figure 3:
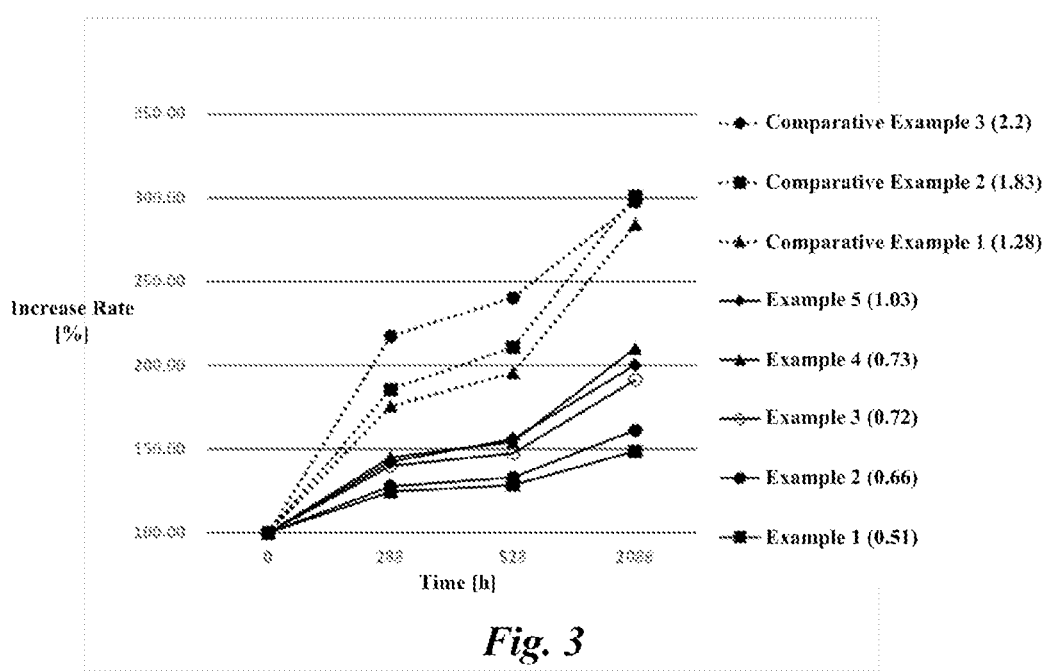
FIG. 3 is a graph indicating changes over time of an increase rate of the ESR in each example and each comparative example under the temperature environment of 150° C.

The solid electrolytic capacitors of the examples 1 to 5 and the comparative examples 1 to 3 were statically placed under three temperature environments, and the ESR over time was measured. When measuring the ESR, AC signal of 100 kHz was added to the solid electrolytic capacitor. Then, the increase rate (percentage) of the ESR over time relative to the initial ESR before the solid electrolytic capacitors were placed under three temperature environments was measured. The results are shown in FIGS. 1 to 3. FIG. 1 is a graph indicating changes over time of the increase rate of the ESR in each solid electrolytic capacitor under the temperature environment of 125° C. FIG. 2 is a graph indicating changes over time of the increase rate of the ESR in each solid electrolytic capacitor under the temperature environment of 135° C. FIG. 3 is a graph indicating changes over time of the increase rate of the ESR in each solid electrolytic capacitor under the temperature environment of 150° C.

Furthermore, the increase rate of the ESR after the solid electrolytic capacitors were statically placed under three temperature environments for 2088 hours is shown in the below table 2.

TABLE 2

| | Interfacial Resistance (mΩ · cm$^2$) | 125° C. (%) | 135° C. (%) | 150° C. (%) |
|---|---|---|---|---|
| Example 1 | 0.51 | 117.27 | 119.58 | 148.71 |
| Example 2 | 0.66 | 115.59 | 123.34 | 161.22 |
| Example 3 | 0.72 | 125.10 | 134.72 | 191.17 |
| Example 4 | 0.73 | 131.13 | 143.24 | 210.22 |
| Example 5 | 1.03 | 135.95 | 146.74 | 200.15 |
| Comparative Example 1 | 1.28 | 148.93 | 187.88 | 284.28 |
| Comparative Example 2 | 1.83 | 163.14 | 203.79 | 301.03 |
| Comparative Example 3 | 2.2 | 186.08 | 227.36 | 297.60 |

As indicated in FIGS. 1 to 3, in the solid electrolytic capacitor of the comparative examples 1 to 3, the ESR greatly increased over time. In contrast, in the solid electrolytic capacitor of the examples 1 to 5, the increase rate of the ESR over time is small, and the increase in the ESE is suppressed. Therefore, there was a great difference between the ESR in the comparative examples 1 to 3 and the ESR of the examples 1 to 5 after 2088 hours had passed.

In detail, as shown in the table 2, under the temperature environment of 125° C., the maximum increase rate in the examples 1 to 5 was 131.13, the minimum increase rate in the comparative examples 1 to 3 was 148.93, and the difference was 17.8. Under the temperature environment of 135° C., the maximum increase rate in the examples 1 to 5 was 146.74, the minimum increase rate in the comparative examples 1 to 3 was 187.79, and the difference was 41.05. Under the temperature environment of 150° C., the maximum increase rate in the examples 1 to 5 was 210.22, the minimum increase rate in the comparative examples 1 to 3 was 284.28, and the difference was 74.06. As the temperature increases, the difference between the examples 1 to 5 and the comparative examples 1 to 3 becomes more significant.

In the examples 1 to 5, the interfacial resistance between the cathode foil and the carbon layer was 1.1 mΩ·cm$^2$ or less. In contrast, in the comparative examples 1 to 3, the interfacial resistance between the cathode foil and the carbon layer was 1.28 mΩ·cm$^2$ or more. Accordingly, it was found that, in the electrolytic capacitor, the cathode body includes the cathode foil formed of valve metal and the carbon layer laminated on the cathode foil, and by making the interfacial resistance between the cathode foil and the carbon layer to be 1.1 mΩ·cm$^2$ or less, the increase in the ESR under the high temperature environment can be suppressed. In particular, when the adhesion between the cathode foil and the carbon layer was improved by forming the oxide film of about 0.5 to 3 V on the cathode foil, even though it is considered that the interfacial resistance might become large due to the oxide film, by adjusting the interfacial resistance to be 1.1 mΩ·cm$^2$ or less as the present disclosure, the reduction of the capacitance can be suppressed even when the oxide film is formed on the surface of the cathode foil.

Furthermore, it was found that by suppressing the increase rate of the ESR after 2088 hours had passed to less than 115% under the environment of 125° C., less than 130% under the environment of 135° C., and less than 150% under the environment of 150° C., the stability for a long time can be achieved. Such a phenomenon significantly appears at higher temperature.

The invention claimed is:

1. An electrolytic capacitor comprising an anode foil, a cathode body, and electrolytic solution, Wherein:

the anode foil is formed of valve metal and has a dielectric oxide film formed on a surface thereof, the cathode body includes a cathode foil formed of valve metal, an oxide film of 0.5 V to 3 V on the cathode foil, and a carbon layer laminated on the oxide film, and an interfacial resistance between the cathode foil and the carbon layer is 1.1 mΩ·cm$^2$ or less.

2. The electrolytic capacitor according to claim 1, wherein the electrolytic solution includes water.

3. The electrolytic solution according to claim 1, wherein the electrolytic solution includes alcohol as a solvent, and carboxylic acid, carboxylic acid salt, or both as a solute.

4. The electrolytic capacitor according to claim 1, wherein the cathode foil has an enlarged surface layer on a surface thereof and has the carbon layer on the enlarged surface layer.

5. The electrolytic capacitor according to claim 1, wherein the carbon layer is pressure-welded to the cathode foil.

6. The electrolytic capacitor according to claim 1, further comprising a solid electrolyte layer formed on the surface of the anode foil and the surface of the cathode body, in addition to the electrolytic solution.

7. The electrolytic capacitor according to claim 6, wherein the electrolytic solution includes water.

8. The electrolytic capacitor according to claim 7, wherein the electrolytic solution includes alcohol as a solvent, and carboxylic acid, carboxylic acid salt, or both as a solute.

9. The electrolytic capacitor according to claim 7, wherein the cathode foil has an enlarged surface layer on a surface thereof and has the carbon layer on the enlarged surface layer.

10. The electrolytic capacitor according to claim 9, wherein the carbon layer is pressure-welded to the cathode foil.

11. The electrolytic capacitor according to claim 10 wherein the electrolytic solution includes alcohol as a solvent, and carboxylic acid, carboxylic acid salt, or both as a solute.

12. The electrolytic capacitor according to claim 7, wherein the carbon layer is pressure-welded to the cathode foil.

13. The electrolytic solution according to claim 6, wherein the electrolytic solution includes alcohol as a solvent, and carboxylic acid, carboxylic acid salt, or both as a solute.

14. The electrolytic capacitor according to claim 13, wherein the carbon layer is pressure-welded to the cathode foil.

15. The electrolytic capacitor according to claim 14, wherein the cathode foil has an enlarged surface layer on a surface thereof and has the carbon layer on the enlarged surface layer.

16. The electrolytic capacitor according to claim 6, wherein the cathode foil has an enlarged surface layer on a surface thereof and has the carbon layer on the enlarged surface layer.

17. The electrolytic capacitor according to claim 16, wherein the carbon layer is pressure-welded to the cathode foil.

18. The electrolytic capacitor according to claim 6, wherein the carbon layer is pressure-welded to the cathode foil.

19. A cathode body of an electrolytic capacitor, comprising:
a cathode foil formed of valve metal,
an oxide film of 0.5 V to 3 V on the cathode foil, and
a carbon layer formed on the oxide film,
wherein an interfacial resistance between the cathode foil and the carbon layer is 1.1 m$\Omega \cdot$cm$^2$ or less.

20. A manufacturing method of an electrolytic capacitor including an anode foil, a cathode body, and electrolytic solution, comprising:
a cathode body production process of forming an oxide film of 0.5 V to 3 V on a cathode foil formed of valve metal, and a carbon layer on the oxide film, and pressure-welding the carbon layer to the cathode foil by pressing until an interfacial resistance therebetween becomes 1.1 m$\Omega \cdot$cm$^2$ or less to produce the cathode body;
a capacitor element production process of arranging the anode foil which a dielectric oxide film is formed on a surface thereof and the cathode body produced in the cathode body production process to face each other to produce a capacitor element; and
an impregnation process of impregnating the capacitor element with the electrolytic solution.

* * * * *